(12) United States Patent
Herrington

(10) Patent No.: US 12,154,095 B2
(45) Date of Patent: *Nov. 26, 2024

(54) GENERATING A SENSORY INDICATION

(71) Applicant: Capital One Services, LLC, McLean, VA (US)

(72) Inventor: Daniel Herrington, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,139

(22) Filed: Aug. 10, 2023

(65) Prior Publication Data
US 2023/0385805 A1     Nov. 30, 2023

Related U.S. Application Data

(63) Continuation of application No. 17/819,135, filed on Aug. 11, 2022, now Pat. No. 11,734,672, which is a continuation of application No. 17/181,194, filed on Feb. 22, 2021, now Pat. No. 11,443,297, which is a continuation of application No. 16/828,772, filed on Mar. 24, 2020, now Pat. No. 11,120,425, which is a continuation of application No. 16/655,195, filed on Oct. 16, 2019, now Pat. No. 10,643,199, which is a continuation of application No. 16/240,623, filed on Jan. 4, 2019, now Pat. No. 10,482,454, which is a
(Continued)

(51) Int. Cl.
*G06Q 20/34* (2012.01)
*G01S 19/01* (2010.01)
*G06K 19/07* (2006.01)
*G06K 19/077* (2006.01)
*G06Q 20/32* (2012.01)
*G06Q 20/40* (2012.01)
*G07F 7/08* (2006.01)

(52) U.S. Cl.
CPC ............ *G06Q 20/341* (2013.01); *G01S 19/01* (2013.01); *G06K 19/0723* (2013.01); *G06K 19/07703* (2013.01); *G06Q 20/3224* (2013.01); *G06Q 20/349* (2013.01); *G06Q 20/409* (2013.01); *G07F 7/0833* (2013.01); *G07F 7/0846* (2013.01)

(58) Field of Classification Search
CPC ... G06Q 20/341; G01S 19/01; G06K 19/0723
USPC ......................................................... 235/380
See application file for complete search history.

(56) References Cited

U.S. PATENT DOCUMENTS 5,887,118 A *  3/1999  Huffman ............... A61M 11/042
                                                    361/679.55
10,204,336 B1 *  2/2019  Herrington .......... G06Q 20/409
(Continued)

*Primary Examiner* — Allyson N Trail
(74) *Attorney, Agent, or Firm* — Foley & Lardner LLP

(57) ABSTRACT

In certain embodiments, a sensory indication may be generated on a transaction card. In some embodiments, an input signal associated with a purchase (executed using a transaction card) may be received. Based on the input signal, a timer for an event related to the purchase may be initiated. An output component of the transaction card may be activated when the timer expires. In some embodiments, the input signal may include information specifying a desired indication related to the event, a given output component for generating the desired indication, or other data.

20 Claims, 4 Drawing Sheets

Related U.S. Application Data continuation of application No. 15/870,579, filed on Jan. 12, 2018, now Pat. No. 10,204,336.

(56) References Cited

U.S. PATENT DOCUMENTS

| | | | | |
|---|---|---|---|---|
| 2010/0230487 | A1* | 9/2010 | Johnson | G06Q 20/3415 |
| | | | | 235/380 |
| 2014/0183269 | A1* | 7/2014 | Glaser | G06K 19/07701 |
| | | | | 235/492 |
| 2015/0127392 | A1* | 5/2015 | Shivakumar | G06Q 50/01 |
| | | | | 705/5 |
| 2017/0109730 | A1* | 4/2017 | Locke | G06K 19/02 |
| 2017/0123498 | A1* | 5/2017 | Dillon, Jr. | G06F 3/041 |
| 2017/0154328 | A1* | 6/2017 | Zarakas | G06Q 20/204 |
| 2018/0082552 | A1* | 3/2018 | Moussette | G06F 3/016 |

* cited by examiner

GENERATING A SENSORY INDICATION

CROSS-REFERENCE TO RELATED APPLICATIONS

This application is a continuation of U.S. patent application Ser. No. 17/819,135, filed Aug. 11, 2022, which is a continuation of U.S. patent application Ser. No. 17/181,194, filed Feb. 22, 2021, which is a continuation of U.S. patent application Ser. No. 16/828,772, filed Mar. 24, 2020, which is a continuation of U.S. patent application Ser. No. 16/655,195, filed Oct. 16, 2019, which is a continuation of U.S. patent application Ser. No. 16/240,623, filed Jan. 4, 2019, which is a continuation of U.S. patent application Ser. No. 15/870,579, filed Jan. 12, 2018. The content of each of the foregoing applications is incorporated herein in its entirety by reference.

BACKGROUND INFORMATION

When a conventional transaction card is used at a transaction terminal to make a purchase, the terminal reads information, for example, card number, expiration date, security code, etc. embedded in a chip or magnetic strip on the card. Other information, for example, the remaining limit on the card, can be retrieved via a network connection, in order to accept or decline a transaction amount. There are some companies, like Swyp®, Stratos® and Plastc® that offer a type of transaction card known as a "smart" card. A smart card is capable of embedding information from move than one transaction card account on a single card. A potential advantage of a smart card is that if a user has more than one account, the user could carry a single smart card with embedded information from all of the accounts owned by the user, rather than carry multiple transaction cards. More information on smart cards can be found in, for example, an article written by David Pierce on May 5, 2015 entitled "My Weekend Confusing People With a Futuristic Credit Card" published in WIRED magazine and an article written by Sharon Profis on May 25, 2015 entitled "Smart credit cards are coming. Here's what you need to know." published in CNET.

Conventional transaction cards and smart cards have information of the card and an owner's card account embedded on the cards, but these cards are not capable of, for example, displaying information pertaining to an owner of the cards. In particular, these cards are not capable of creating a synchronized experience by generating a simultaneous display across cards owned by a plurality of users or an audible personal experience for a single user of the cards. For example, multiple owners of cards used to purchase tickets for an event cannot simultaneously be recipients of a visual, audial, haptic, olfactory, etc. experience generated by the cards during the event by, for example, having their cards simultaneously light up 3 seconds after a touchdown for a duration of 10 seconds during a football game, or at the start of a rock concert, or at the stroke of midnight on December 31 at Times Square. These experiences can be, for example, an advertising initiative created by an issuer of the card to demonstrate its member strength or an individualized experience, for example emitting "woo hoo" sounds from a card when an owner uses the card for the 100.sup.th time to purchase gas at a particular gas station. Such experiences cannot be accomplished with conventional transaction or smart cards.

SUMMARY

Consistent with the present disclosure, systems and methods are provided for generating a sensory indication on a transaction card. Embodiments consistent with the present disclosure include computer-implemented systems and methods for generating a sensory indication on a transaction card whereby the user is rewarded with a visual, audial, haptic, olfactory, etc. experience in the future. Embodiments consistent with the present disclosure may overcome the drawbacks or problems set forth above.

Consistent with one exemplary embodiment, a computer-implemented method is provided for generating a sensory indication. The method comprises executing a purchase transaction using a transaction card, the purchase transaction relating to an event, charging a rechargeable power source on the transaction card, receiving an input signal by the card, the input signal indicating an output indication relevant to the event, and generating an output signal using power from the power source, based on the input signal.

Consistent with another exemplary embodiment, a transaction card comprises a security component enabling a purchase transaction relating to an event, a rechargeable power source receiving charging energy at the time of the purchase transaction, an input component receiving an input signal comprising information specifying a desired indication relevant to the event, an output component for generating the desired indication, one or more memories storing instructions and one or more processors executing the instructions to perform operations comprising storing the received information, supplying energy from the power source to the out component, and generating the output signal, based on the input signal is disclosed.

Consistent with another embodiment, a computer-readable storage medium comprises a set of instructions executable by at least one processor to perform a method for generating a sensory indication is disclosed. The method comprising executing a purchase transaction using a transaction card, the purchase transaction relating to an event, charging a rechargeable power source on the transaction card, receiving an input signal by the card, the input signal specifying an output indication related to the event, and generating an output signal using power from the power source, based on the input signal.

Consistent with other disclosed embodiments, non-transitory computer readable storage media may store program instructions, which are executed by at least one processing device and perform any of the methods described herein.

Before explaining certain embodiments of the present disclosure in detail, it is to be understood that the disclosure is not limited to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be used as a basis for designing other charge cards, methods, and systems for carrying out the several purposes of the present disclosure. Furthermore, the claims should be regarded as including such equivalent constructions insofar as they do not depart from the spirit and scope of the present disclosure.

DETAILED DESCRIPTION

Figure 1:
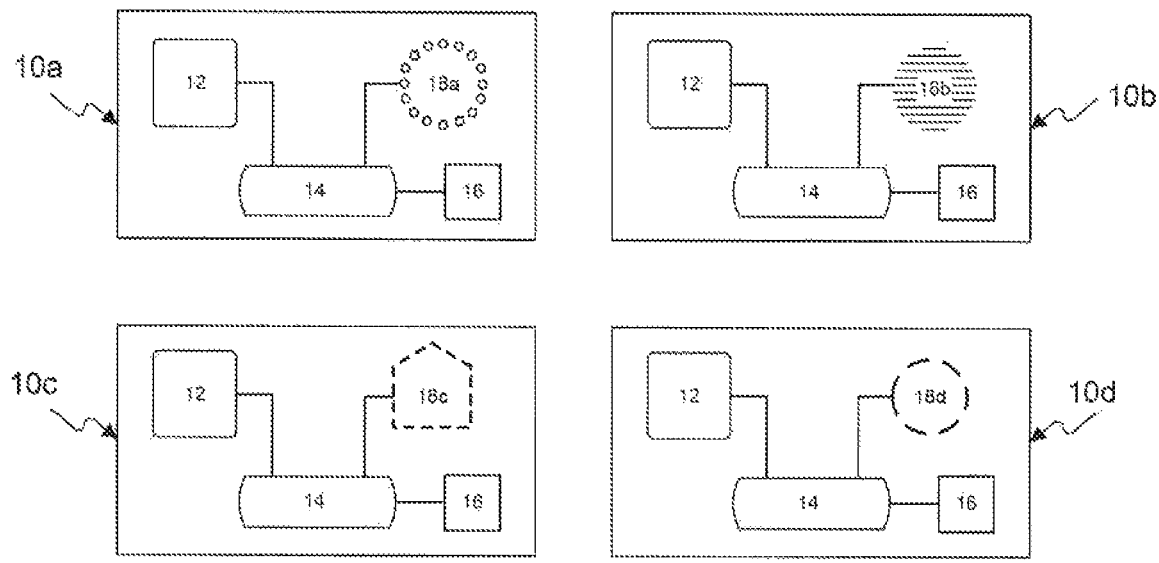
FIG. 1 illustrates exemplary transaction cards consistent with the disclosed embodiments of the present disclosure.

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable media, and systems. The computer-implemented methods may be executed, for example, by at least one processor (e.g., a processing device) that receives instructions from non-transitory computer-readable storage media. Similarly, systems consistent with the present disclosure may include at least one processor and memory, and the memory may be non-transitory computer-readable storage media. As used herein, a non-transitory computer-readable storage media refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage media. Singular terms, such as "memory" and "computer-readable storage medium," may additionally refer to multiple structures, such a plurality of memories and/or computer-readable storage media. As referred to herein, a "memory" may comprise any type of computer-readable storage media unless otherwise specified. A computer-readable storage medium may store instructions for execution by at least one processor, including instructions for causing the processor to perform steps or stages consistent with an embodiment herein. Additionally, one or more computer-readable storage media may be utilized in implementing a computer-implemented method. The term "computer-readable storage media" should be understood to include tangible items and exclude carrier waves and transient signals.

Embodiments of the present disclosure provide systems and methods for generating a sensory indication. The disclosed embodiments allow a terminal to facilitate a purchase transaction via a security component, for example, a chip built into a transaction card, when the card is presented at the terminal by placing the card inside a special slot, i.e., chip reader, on the terminal. The purchase transaction can also be facilitated via a magnetic strip built into the card, in which case the card is presented by swiping through a special channel on the terminal. The purchase transaction can be enabled remotely, in which case the card is presented by waving the card in close proximity to a special reader portion on the terminal. These are just some of the ways that the transaction can be enabled, and these ways are not limiting.

The disclosed embodiments include a power source, e.g., a rechargeable battery or a capacitor, built into the card to be powered while the card is presented at the terminal by placing it inside, swiping through, or waving near the terminal. According to some embodiments consistent with the present disclosure, only certain purchases cause the power source to be charged, while in other embodiments the power source is charged during all purchases or for selected purchases based on an individual user's preference or purchasing habits. These are just some of the ways and times the power source is charged, and these ways are not limiting. In some embodiments, the card draws power from the terminal itself while the card is placed inside, swiped through, or waved near the terminal. Drawing power in these and other manners is known in the art and hence will not be explained in further detail.

The disclosed embodiments may further include an input component on the card to receive input signals. Receipt of these input signals may be controlled by a user through user preferences or by the issuer of the card. Both controlling methods may employ GPS capability and wired or wireless networking to function as intended. Since the methodology of GPS and networking is well known in the art, it will not be further elaborated. According to embodiments consistent with the present disclosure, the input signals may be, for example, indications of a certain day and time during an event for which a purchase is made. For example, if the purchase is a ticket for a football game on Monday, Jan. 1, 2018 and the game begins at 5 PM EST, the input signal may be a static signal, inputted into the card to enable an activation component (discussed later) when the purchase was made at the terminal, with the input signal specifying the starting time of the game. According to embodiments consistent with the present disclosure, since the input signal is inputted into the card when the purchase was made at the terminal, the signal activates the sensory indication using GPS coordinates of the card's location. Accordingly, every card present at the game will emit an output signal (discussed later) and every card not present at the game will also emit the output signal.

The input signal may also be a dynamic signal, for example, wirelessly transmitted to and received by the card at the desired time of the sensory indication, using GPS coordinates of the football game's location. For example, the input signal may initiate a sensory indication at a time just after the National Anthem is played or just after a touchdown has been confirmed. Accordingly, every card present at the game will receive the dynamic input signal and every card not present at the game will not. According to embodiments consistent with the present disclosure, the issuer of the card may control the transmission of the dynamic input signal. For example, if the issuer of the card is aware that a majority of its card holders are rooting for a team, the issuer may send the dynamic signal to cards of just the majority card holders, or send it to a majority of cards with haptic capability only, or to a majority of cards with audial capability only. On the other hand, if the game is the Orange Bowl football game in Florida, the issuer may send the dynamic signal to cards of all card holders, so that a majority of spectators emit the output signal.

The input signal may also be generated, for example, upon a countdown of a certain repeated occurrence. For example, if a user uses a specific gas station to make gas purchases more regularly than at other gas stations, the input signal could be generated when, for example, a $100.\text{sup}.\text{th}$ purchase is made at that gas station.

The disclosed embodiments may further include an output component for generating an output signal consisting of a sensory indication. According to embodiments consistent with the present disclosure, the sensory indication may be a display of lights, sounds, smells, haptic sensations (e.g., vibrations), or other type of indication which may be perceived by human senses. According to embodiments consistent with the present disclosure, the output component is powered by the power source and may generate the output signal upon activation by an activation component (discussed below).

The disclosed embodiments comprise an activation component for activating the output component to generate the output signal. According to embodiments consistent with the present disclosure, the activation component may be enabled by an input signal when a purchase is made using the transaction card. For example, when the card is inserted in a chip reader or swiped in a strip reader on a terminal, the card receives an input signal enabling the activation component to begin a count-down to an event based on the input signal. As discussed, the event could be a certain day and time during an event for which a purchase is made or a countdown based on a certain repeated occurrence. According to embodiments consistent with the present disclosure, the activation component may employ a RAM chip, which requires power drawn from the power source to stay functional. In this embodiment, if the transaction card is lost or damaged, the power source could be turned off via, for example, a user-set preference. According to embodiments consistent with the present disclosure, data for the activation component may be stored in a ROM chip, which does not require power drawn from the power source to stay functional. In this embodiment, if the transaction card is lost or damaged, the timer within the activation component could still be turned off by special instructions via, for example, a user preference.

FIG. 1 illustrates exemplary transactions cards 10a-10d, consistent with the present disclosure. Transaction cards 10a-10d may each have a semiconductor chip 12, a power source 14, an activation component 16, and an output component 18a-18d, respectively, embedded in the card. In some embodiments, functions of activation component 16 may be implemented in chip 12. Each card may also have a magnetic strip (not shown) affixed thereto.

Chip 12 may appear as a gold-colored square imprint on the card, and contain the card's information, for example, the number, expiration date, etc. Chip 12 may also include card owner information, for example, name and address, which may be used to print on a receipt, as well as financial information, for example, the remaining balance available on a debit card. Chip 12 may also contain a security component of the card that enables a purchase transaction to be honored or denied.

According to disclosed embodiments, chip 12 may also include functionality to receive an input signal associated with a particular day and time connected with the purchase. For example, if the purchase is for a ticket to a football game, the input signal may specify the starting time of the game. Chip 12 may also receive an input signal associated with a real-time event, such as scoring of a touchdown. Moreover, chip 12 may also generate an input signal upon, for example, completion of a specified number of purchases from the same merchant. In lieu of chip 12 receiving the input signal, each card may also have a receiving component (not shown), separate from chip 12 and embedded in the card.

Power source 14 may be a rechargeable battery or a capacitor capable of storing electrical energy. According to disclosed embodiments, the power source may be charged when the card is presented at a terminal by inserting, swiping, or waving. The charging of the power source may be done every time the card is presented at a terminal or for only certain purchases.

Activation component 16 activates an output component (discussed later) to generate an output signal. According to disclosed embodiments, activation component 16 may be enabled when a purchase is made using the transaction card. When the card is inserted in the chip reader on a terminal, activation component 16 may start a count-down to a time associated with an event related to the purchase.

Returning to FIG. 1, output components 18a-18d generate an output signal upon activation by activation component 16. Even though only four different types of output components are discussed, other types of output components are well within the scope of the present disclosure. The output component is powered by power source 14 and is activated by activation component 16. According to disclosed embodiments, card 10a has output component 18a which generates a visual indication and may include, for example, a light-emitting diode (LED). Card 10b includes an output component 18b which may generate a sonic output using, for example, a speaker. Card includes an olfactory output component 18c for emitting an odor associated with an event. For example, if the event is the Orange Bowl football game in Florida, the odor emitted could be that of orange blossoms. Card 10d includes a haptic output component generating an output indication sensible via touch. For example, 18d may be a gyroscope device capable of making the card vibrate.

Each card could have multiple output components that may function independently or in synchronism with each other. For example, a card may have both an output component capable of a visual indication and a separate output component capable of sonic indication. When the output components are activated, the card could light up and emit a sound if both output components are functioning in synchronism with each other. According to disclosed embodiments, when a card has multiple output components, each component may be independently connected to power source 14. A user may arrange with a card issuer to choose which and how many output components to be placed on the card.

Figure 2:
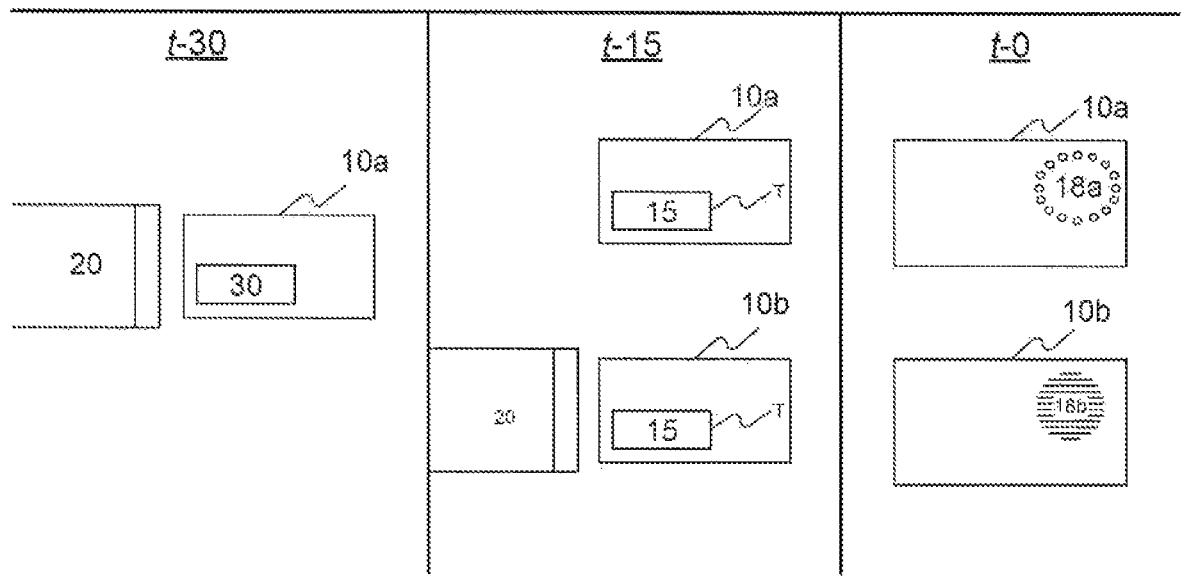
FIG. 2 is a timing diagram illustrating an exemplary operation of a transaction card, consistent with the present disclosure.

FIG. 2 is a timing diagram illustrating operation of an exemplary transaction card, consistent with the present disclosure. At a time t-30, a card 10a belonging to a user is used at a terminal 20 to make a purchase. For example, the purchase may be for a ticket to a concert that begins at time t. The purchase causes terminal 20 to send an input signal to chip 12, causing activation component 16 to generate and supply an output signal to output component 18a. As illustrated, activation component 16 of card 10a stores a value of 30.

Next, at a time t-15, a card 10b belonging to a second user is used at the same or a different terminal 20 to purchase a ticket to the same concert. Card 10b receives an input signal from terminal 20 and activation component 16 of card 10b stores a value of 15. As illustrated, activation component 16 of card 10a, which is continually being updated with passage of time, is updated to Next, at time t-0, activation component 16 in card 10a activates the output component 18a and the card lights up. Simultaneously, the activation component 16 in card 10b activates output component 18b and card 10b emits a sound. In a similar manner, cards, 10a-10d of other users in the audience simultaneously generate sensory indications, causing a synchronized indication of light, sound, odor, and/or vibrations. Such a synchronized group activity is not capable by conventional transaction cards or smart cards.

Figure 3:
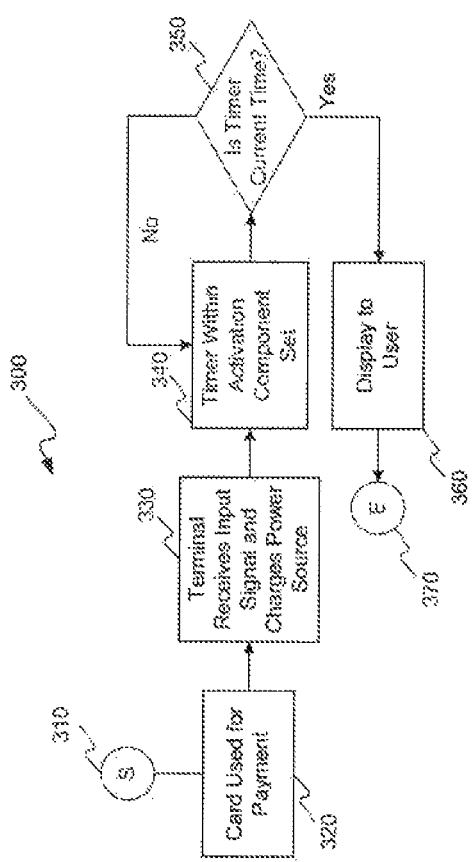
FIG. 3 is a flowchart of events illustrating an exemplary operation of a transaction card, consistent with the present disclosure.

FIG. 3 is a flowchart of events illustrating an exemplary method 300 of a transaction card, for example 10a, in accordance with the present disclosure. At step 310, the method starts and continues to step 320 where card 10a is used to make a purchase at a terminal 20. At step 330, this purchase causes terminal 20 to charge power source 14, and send an input signal to card 10n. Next at step 340, the input signal causes activation component 16 to be supplied with data specifying a day and time associated with the event for which the ticket was purchased. As explained earlier, if the purchase is for a sporting event, the data could specify a time during the game (a static time) or a time to prepare to receive a wireless input signal (a dynamic time). Next at step 350, activation component 16 makes a check to see if the stored data matches the current time. If there is no match, the method returns to step 340 (the "No" branch from step 350). If, on the other hand, there is a match (the "Yes" branch from step 350), the method proceeds to step 360 where the output component, for example 18a, displays a visual indication, i.e., a display of LED lights and the method ends at step 370.

Figure 4:
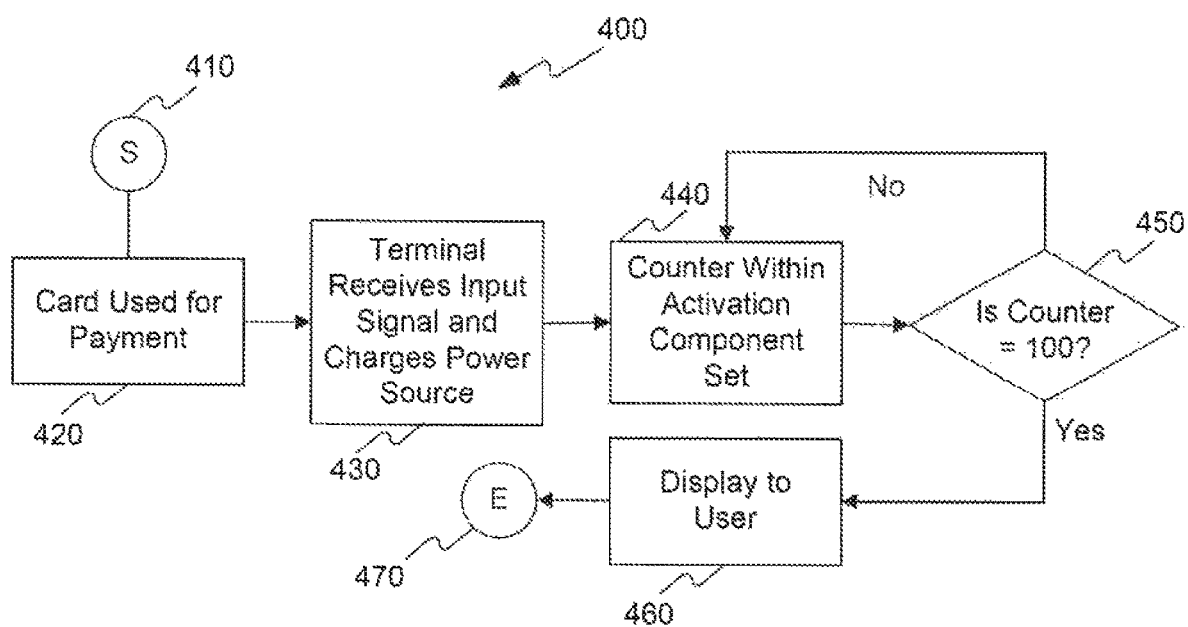
FIG. 4 is a flowchart of events illustrating another exemplary operation of a transaction card, consistent with the present disclosure.

FIG. 4 is another flowchart of events illustrating an exemplary method 400 of a transaction card, for example 10b, in accordance with the present disclosure. At step 410, the method starts and continues to step 420 where card 10b is used for making a purchase at a terminal 20 of a specific merchant. At step 430, this purchase causes terminal 20 to charge power source, for example 14, and send an input signal to card 10b. Next at step 440, the input signal causes activation component 16 to be supplied with data incrementing a counter associated with purchases at the specified merchant. Next at step 450, activation component 16 makes a check to see if the counter value on activation component 16 matches a predetermined threshold, for example, 100. If there is no match, the method returns to step 440 (the "No" branch from step 450). If, on the other hand, there is a match (the "Yes" branch from step 450), the method proceeds to step 460 where activation component 16 causes output component 18b to emit a sound, i.e., a voice message congratulating the user for 100 purchases using the card at the specific merchant, and the method ends at step 470.

It should be noted that activation component 16 may employ more than one timer or counter at any given time. That is, there could be a first active countdown to a first recurring event while there is a second active countdown to a second recurring event. It should also be noted that activation component 16 may be employed for activities other than timed or recurring events. For example, activation component could activate output component 18 upon completion of a purchase of a value greater than a threshold amount, a promotional event associated with a particular purchase, or an advertising initiative by the card issuer for certain purchases. The qualifying factor for activating the output component may be controlled by a user through user preferences (if the user has more than one output component on the card, the user could specify which output component is activated) or by the issuer of the card. Both controlling methods may employ GPS coordination and wired or wireless networking to provide the desired functionality.

In the preceding specification, various exemplary embodiments and features have been described with reference to the accompanying drawings. It will, however, be evident that various modifications and changes may be made thereto, and additional embodiments and features may be implemented, without departing from the broader scope of the disclosed embodiments as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Further, the exemplary graphical user interfaces illustrated in FIGS. 1-2 are for purposes of visually understanding the teachings and embodiments of the present disclosure and are not limiting to the arrangement of the various parts of the interface, or the number of parts viewable by a user.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Furthermore, while embodiments of the present disclosure have been described with reference to generating a sensory indication, embodiments of the present disclosure may be applied to receive, process, and visualize other types of indications in many formats. Other implementations are also within the scope of the following exemplary claims.

Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.). Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A device for processing purchases comprising:
   a chip;
   an activation component coupled to the chip; and
   an output component coupled to the activation component;
   wherein the activation component is configured to:

receive an input signal via the chip;

enable the activation component when a purchase is made; and activate the output component based on a completion event.

2. The device of claim 1, the device further comprising a power source configured to receive a charge from a terminal through an action of inserting, swiping, or waving.

3. The device of claim 2, wherein the input signal is received from the terminal.

4. The device of claim 1, wherein the input signal is controlled by user preferences.

5. The device of claim 1, wherein the input signal further comprises a dynamic signal.

6. The device of claim 1, wherein the input signal is generated based on a countdown of a certain repeated occurrence.

7. The device of claim 1, wherein the output component generates, upon activation, an output signal with a sensory indication.

8. The device of claim 7, wherein the sensory indication includes at least one of a display of lights, sounds, smells, or haptic sensations.

9. The device of claim 1, wherein the activation component is configured to initiate multiple count-downs based on different events.

10. The device of claim 1, wherein the device further comprises a location component configured to transmit location information of the device.

11. The device of claim 10, wherein the activation component is further configured to activate the output component based on location information of the device.

12. The device of claim 1, wherein the completion event is associated with at least one purchase.

13. The device of claim 1, wherein the activation component is further configured to periodically update a value of a count-down stored at the device.

14. The device of claim 1, wherein:

the completion event comprises a plurality of completion events; and the activation component is further configured to initiate a count-down by simultaneously initiating a plurality of count-downs to times associated with the plurality of completion events.

15. A method for processing purchases, comprising:

receiving an input signal associated with a purchase executed using a transaction card;

based on the input signal, initiating a count-down to an event related to the purchase; and activating an output component of the transaction card when the count-down expires.

16. The method of claim 15, further comprising storing a counter value associated with a time of the purchase.

17. The method of claim 16, wherein the input signal is configured to increment the counter value.

18. The method of claim 16, wherein the counter value is a number of purchases at a particular merchant.

19. The method of claim 15, wherein activating the output component comprises instructing the output component to generate a sensory indication.

20. The method of claim 19, wherein the sensory indication is at least one of: a visual indication, an auditory indication, an odor indication, or a touch indication.

* * * * *